United States Patent

Sells

Patent Number: 6,124,855
Date of Patent: *Sep. 26, 2000

[54] JUST-IN-TIME SOFTWARE CONFIGURATION INFORMATION ENTRY

[75] Inventor: Christopher J. Sells, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/787,982

[22] Filed: Jan. 23, 1997

Related U.S. Application Data

[63] Continuation of application No. 08/266,001, Jun. 27, 1994, abandoned.

[51] Int. Cl.[7] .................................................. G06F 3/14
[52] U.S. Cl. ................................. 345/333; 345/348
[58] Field of Search ............................. 395/326, 339, 395/340, 333; 345/333, 352–355, 334–335, 340–349, 356–357, 339, 336–338, 326, 327–328, 329, 145–146

[56] References Cited

U.S. PATENT DOCUMENTS

| | | | |
|---|---|---|---|
| 5,261,042 | 11/1993 | Brandt | 395/156 |
| 5,317,687 | 5/1994 | Torres | 395/159 |
| 5,333,254 | 7/1994 | Robertson | 395/155 |
| 5,345,550 | 9/1994 | Bloomfield | 395/157 |
| 5,347,626 | 9/1994 | Hoeber et al. | 395/156 |
| 5,367,626 | 11/1994 | Morioka et al. | 395/159 |
| 5,388,203 | 2/1995 | Kaneko | 345/334 |
| 5,423,023 | 6/1995 | Batch et al. | 395/500 |
| 5,438,659 | 8/1995 | Notess et al. | 345/335 |
| 5,555,370 | 9/1996 | Li et al. | 345/333 |
| 5,559,947 | 9/1996 | Wugofski | 345/334 |
| 5,559,948 | 9/1996 | Bloomfield et al. | 345/335 |
| 5,581,758 | 12/1996 | Burnett et al. | 395/614 |
| 5,592,603 | 1/1997 | Arato et al. | 345/334 |
| 5,600,778 | 2/1997 | Swanson et al. | 345/333 |
| 5,696,915 | 12/1997 | Johnston, Jr. et al. | 345/335 |

*Primary Examiner*—Steven Sax
*Attorney, Agent, or Firm*—Blakely, Sokoloff, Taylor & Zafman LLP

[57] ABSTRACT

A method of configuring user-configurable, selectable "items" such as menu commands and buttons. An unconfigured item displays a label such as "New . . . " signifying its unconfigured status. When the unconfigured item is selected, the user is prompted for a new label and command. The item then displays the new label and the user-selected command is executed. Thereafter, a selection of the item causes the user-selected command to be executed. The item can be reconfigured by specially selecting the items or by a menu command.

20 Claims, 8 Drawing Sheets

JUST-IN-TIME SOFTWARE CONFIGURATION INFORMATION ENTRY

This is a continuation of application Ser. No. 08/266,001, filed Jun. 27, 1994 now abandoned.

TECHNICAL FIELD

The present invention pertains to the field of user interfaces for computer programs. More specifically, the present invention concerns user-configurable items within a user interface that cause an action to be performed when they are selected.

BACKGROUND ART

Many current application programs provide users with methods of configuring, or "personalizing" their user interfaces. Many word processing and spreadsheet programs are becoming so feature-laden, that if the programs were to include all their commands and macros on the menus and button bars, the users would be overwhelmed. Thus, some programs allow their users to customize the user interfaces by adding or deleting commands from their menus, button bars, or both.

The process required to customize the menus and button bars can be intimidated for a user. The user must manually enter a "configure" mode by selecting a "configure" command from the menu bar. Due to the number of available commands, it may be difficult to locate this command.

What is needed is a simple manner of configuring user-selectable items which doesn't require users to navigate through extensive menus and procedures.

SUMMARY OF THE INVENTION

The present invention provides a method and a system for easily configuring user-selectable "items" such as buttons or icons on button bars, menu commands in menu lists, or any other user-selectable item in the user interface that causes a command to be executed.

According to the present invention, an item is displayed even if it is not configured with an action. The item has a label such as "New . . . " to signify that the item is unconfigured.

When an unconfigured item is selected by a user, the user is prompted for a label and an action to be performed. The label is applied to the item to signify its new meaning. As a feature, the action can be performed immediately after the item is configured. Subsequent selections of the item cause the action to be performed again.

As another feature of the invention, a dialog box may be used to prompt the user for the new label and action. The dialog box may include text entry blocks in which to enter the new label and action.

As another feature of the invention, the user may reconfigure an item. To do so, the user may "specially" select the item, that is, select the item while pressing a "shift," "alt," "control," or other such key. In response, the user is shown the current label and action and prompted for a new label and action.

These and other features, advantages, and objects of the present invention will be made more clear when considering the following specification when taken in conjunction with the appended drawings.

DETAILED DESCRIPTION OF THE INVENTION

Figure 8:
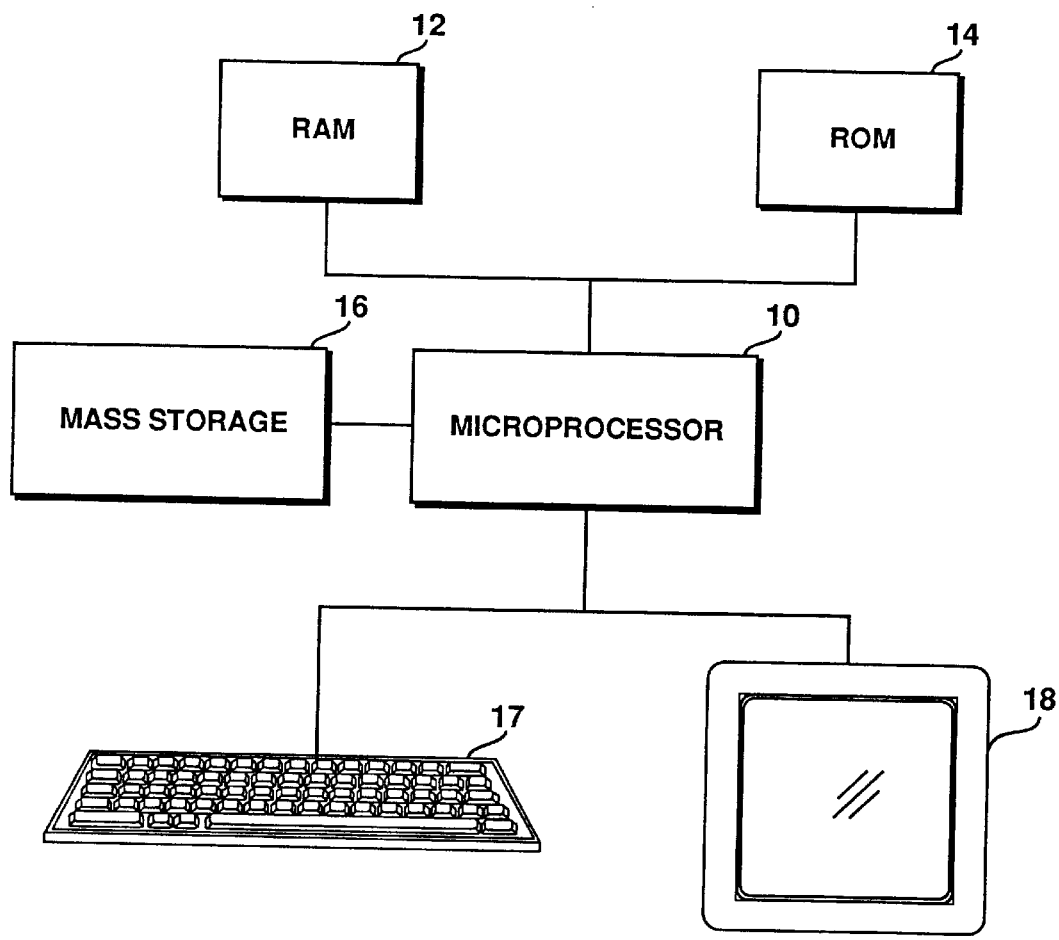
FIG. 8 shows a block diagram of a computer system including a display.

Referring now to the drawings, and first to FIG. 8, a computer system for performing the present invention includes a microprocessor 10 and has random-access memory (RAM) 12 and read-only memory (ROM) 14. The computer system has a mass storage device 16, a keyboard 17 for receiving input from the user, and a display 18 for providing information to the user.

Figure 1:
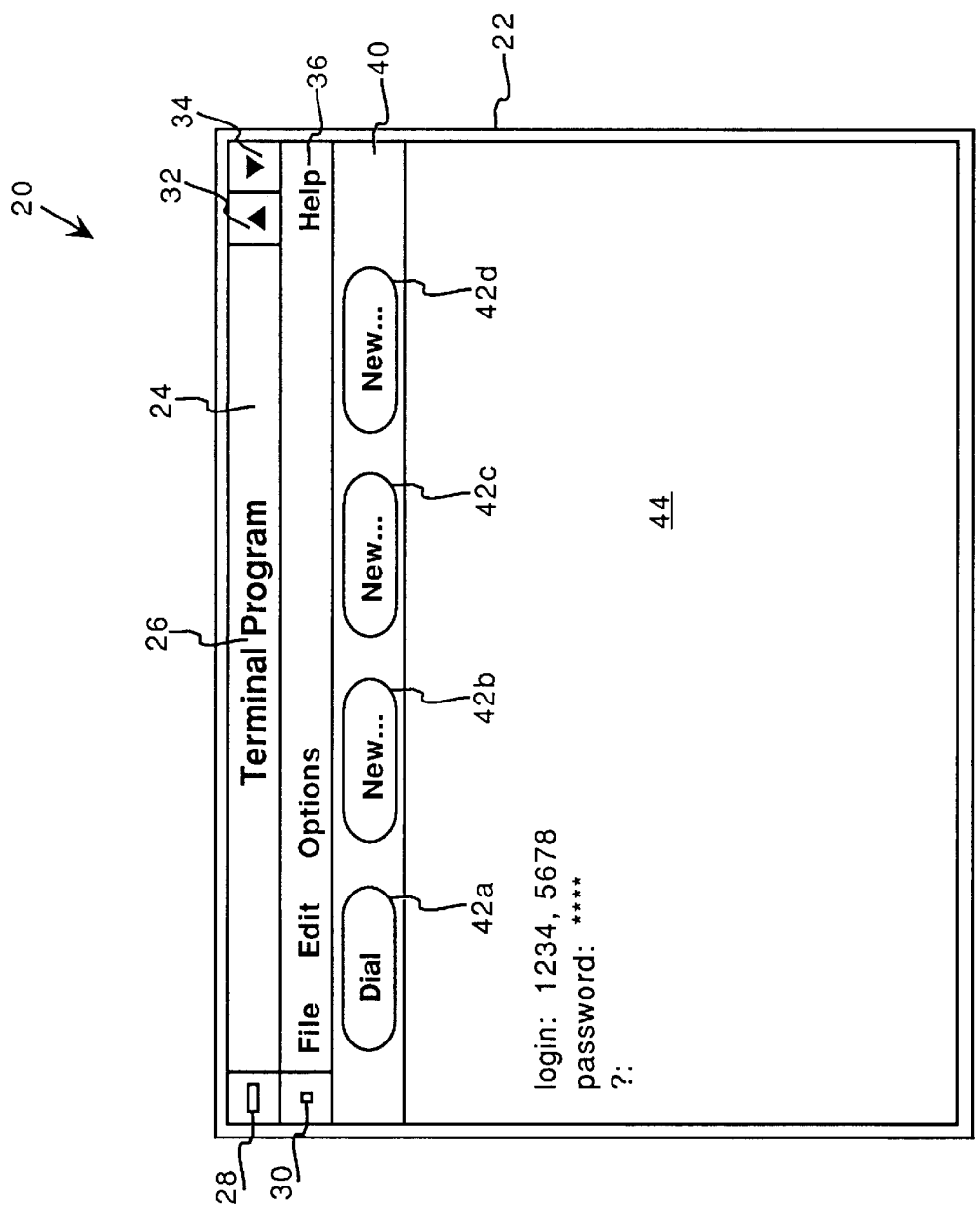
FIG. 1 shows a program window from a computer display including a configurable tool bar.

Referring now to FIG. 1, a window which is shown on the computer display 18 is designated generally by the numeral 20. The window 20 includes a frame 22 and a title bar 24. The title bar 24 includes a title 26 "Terminal Program" which identifies the window 20.

The window 20 also includes control-menu boxes 28, 30, a minimize sizing button 32 and a maximize sizing button 34.

Figure 4:
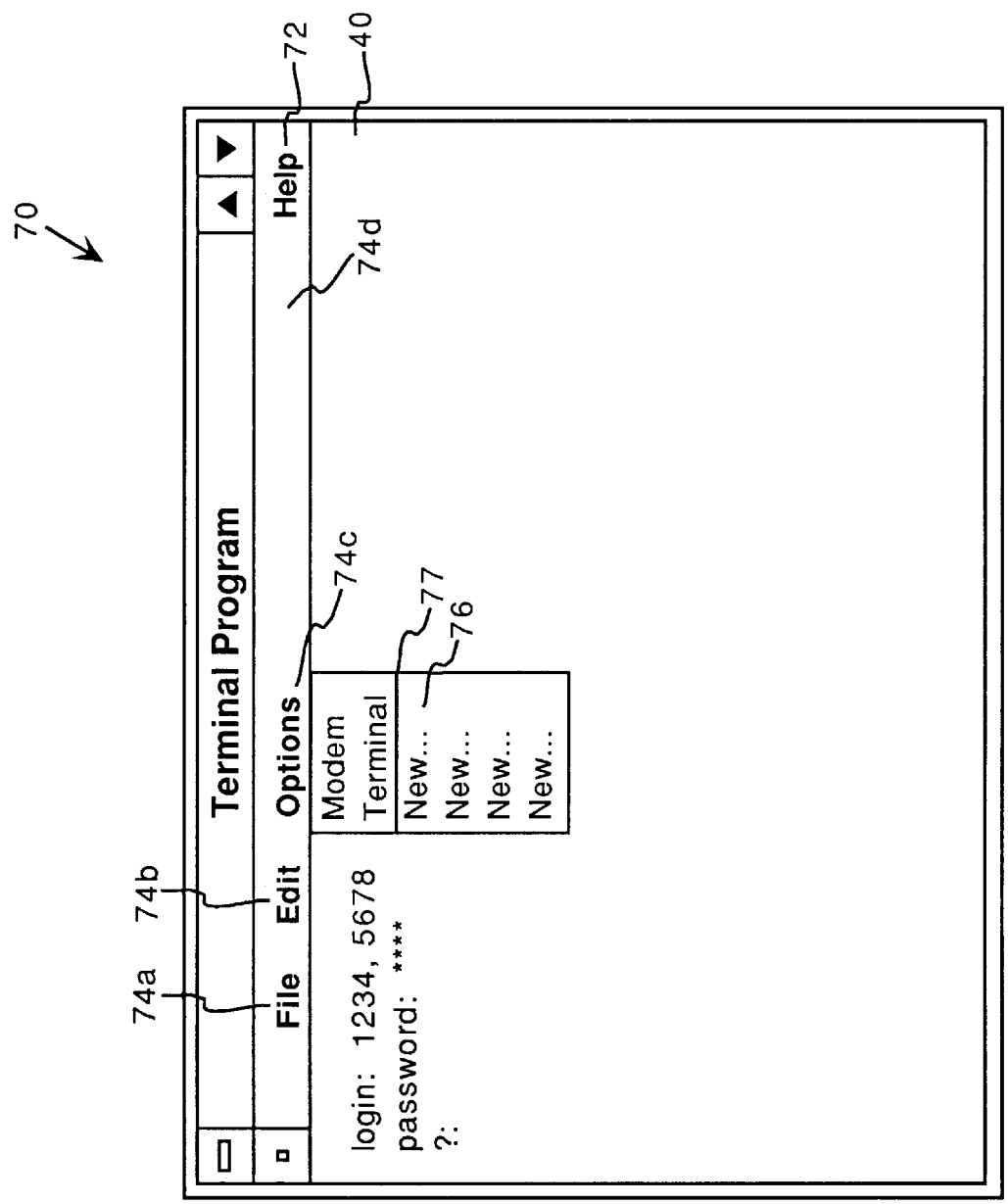
FIG. 4 shows a program window with a configurable menu list visible.

Beneath the title bar 24 is a menu bar 36 which lists available menus. The menus shown on the exemplary menu bar 36 includes "File," "Edit," "Options," and "Help." These menus contain lists of related commands. As shown in FIG. 4, a menu 74c can be selected to open it and thus display its list of commands. When a command is selected from a menu list, the command is executed.

Referring again to FIG. 1, a button bar 40 is located below the menu bar 36. The button bar 40 includes a plurality of selectable buttons 42a–42d. The method of assigning labels and commands to these buttons 42a–42d is central to the present invention.

The work area 44 is the large rectangular box bounded by the frame 22 on the left, bottom, and right sides, and the button bar 40 on the top. The exemplary window 20 contains a terminal program. Thus, the work area 44 displays the communication session with a remote host (not shown).

The work area 44 shows the beginning of a communication session with the remote host. The user has provided his user identification and password. The remote host has displayed a "?:" prompt and is waiting for a command from the user.

In this example, the command a user would enter to read his mail is simply "go mail." Because the user intends to check his mail frequently, he would like this command assigned to one of the unused buttons 42a–42d of the button bar 40. To start the process, the user selects an unconfigured button having the label "New . . . " such as the second button 42b.

Figure 2:
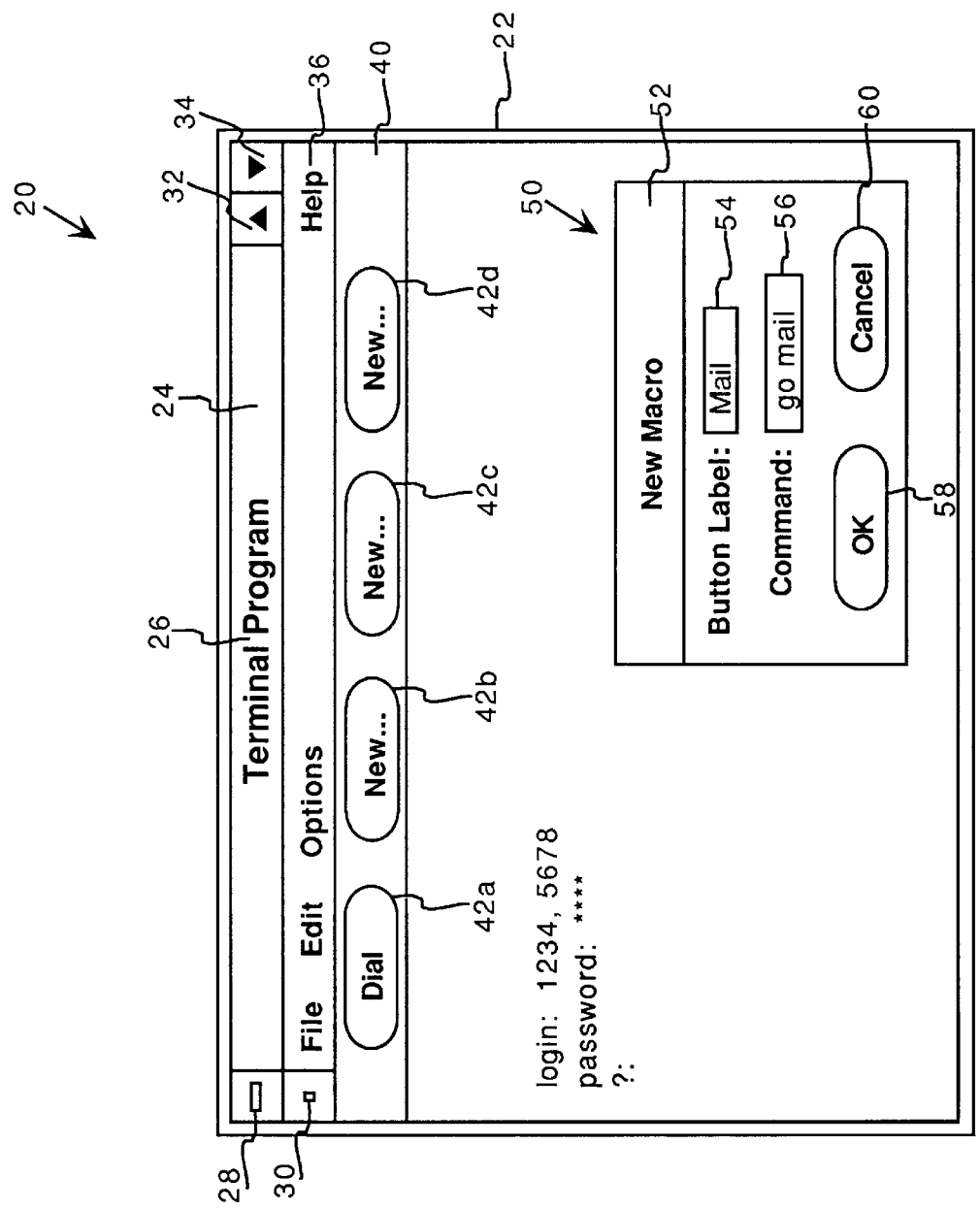
FIG. 2 shows the program window of FIG. 1 with a configuration dialog box.

Referring now to FIG. 2, in response to the user selecting unconfigured button 42b, the program displays a dialog box 50 having a title bar 52 labeled "New Macro." The dialog box 50 contains two text entry boxes 54, 56. In the first box 54, the user enters the label to be displayed on the button 42b. In the second box 56, the user enters the command the button 42b is to execute. In this example, the user has selected the button label to be "Mail" and the command to be "go mail." To accept the new button configuration, the user selects the "OK" button 58. Otherwise, the user can cancel the configuration by selecting the "Cancel" button 60.

Figure 3:
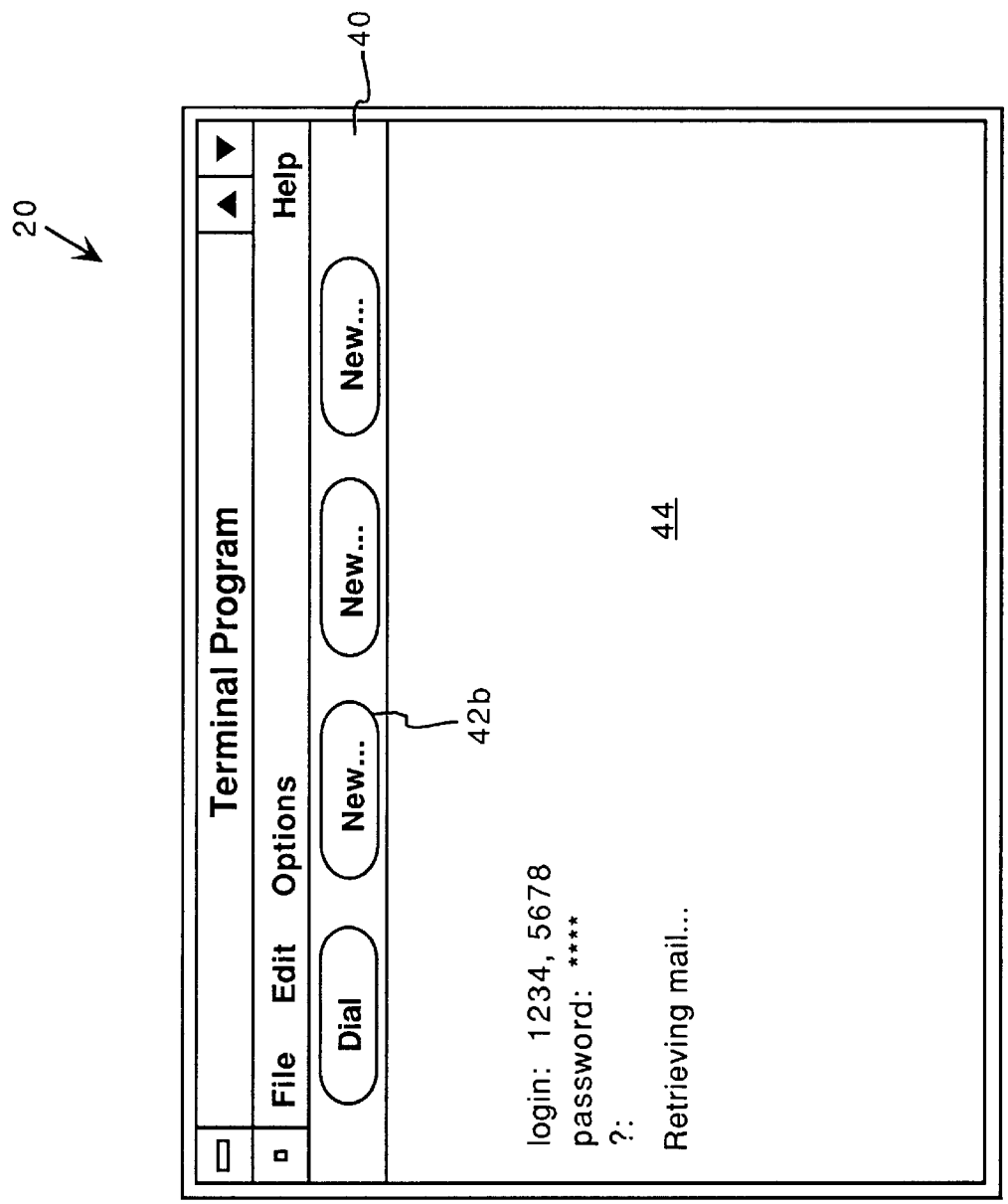
FIG. 3 shows the program window of FIG. 1 after configuration of an icon on the tool bar.

Refer now to FIG. 3, which shows the program window 20 immediately after the user has accepted the new configuration of the second button 42b on the button bar 40. The second button 42b now displays the label "Mail." The program has executed the new command by entering "go mail" at the "?:" prompt. The remote host has responded with "Retrieving mail . . . " and will soon display its mail program screen in the work area 44.

Subsequent selections of the second button 42b will cause the program to execute "go mail." In this manner, the user is able to program a button 42a–42d on the button bar 40 to execute a command with minimal extra keystrokes over manually entering the command.

The buttons 42a–42d on the button bar 40 also can be reconfigured with new labels and commands after they have been configured. They cannot be reconfigured by merely selecting them as when they were first configured; this would cause their associated commands to be executed. Instead, to reconfigure a button, it must be "specially" selected, that is selected with a "shift" key, "alt" key, "control" key, or other such key depressed. Alternatively, a secondary button on the mouse may be used to select the button.

In response to a button 42a–42d being specially selected, the dialog box 50 shown in FIG. 2 is displayed. When a button 42a–42d is being configured for the first time, the text entry boxes 54, 56 are initially empty. When a button 42a–42d is being reconfigured, the text entry boxes 54, 56 preferably contain the current label and command, respectively. The user is able to change either or both boxes, and accept or reject the changes with the "OK" and "Cancel" buttons 58, 60, respectively.

It will be appreciated that other methods of reconfiguring buttons 42a–42d could be used without detracting from the ease of initial configuration by merely selecting a button.

The method described above to configure buttons 42a–42d also can be used to configure commands on a menu. Referring now to FIG. 4, another window 70 is shown which shares many of the same elements with the window 20 shown in FIGS. 1–3. Of particular relevance, the window 70 has a menu bar 72 with menus displayed on it. In particular, the menus are "File" 74a, "Edit" 74b, "Options" 74c, and "Help" 74d. The "Options" menu 74c has been selected and is shown opened.

Similar to the first example, in this second example, the user desires to program the first "New" command 76 to read his mail. To do so, the user selects the "Options" menu 74c and then selects the first "New" command 76.

Figure 5:
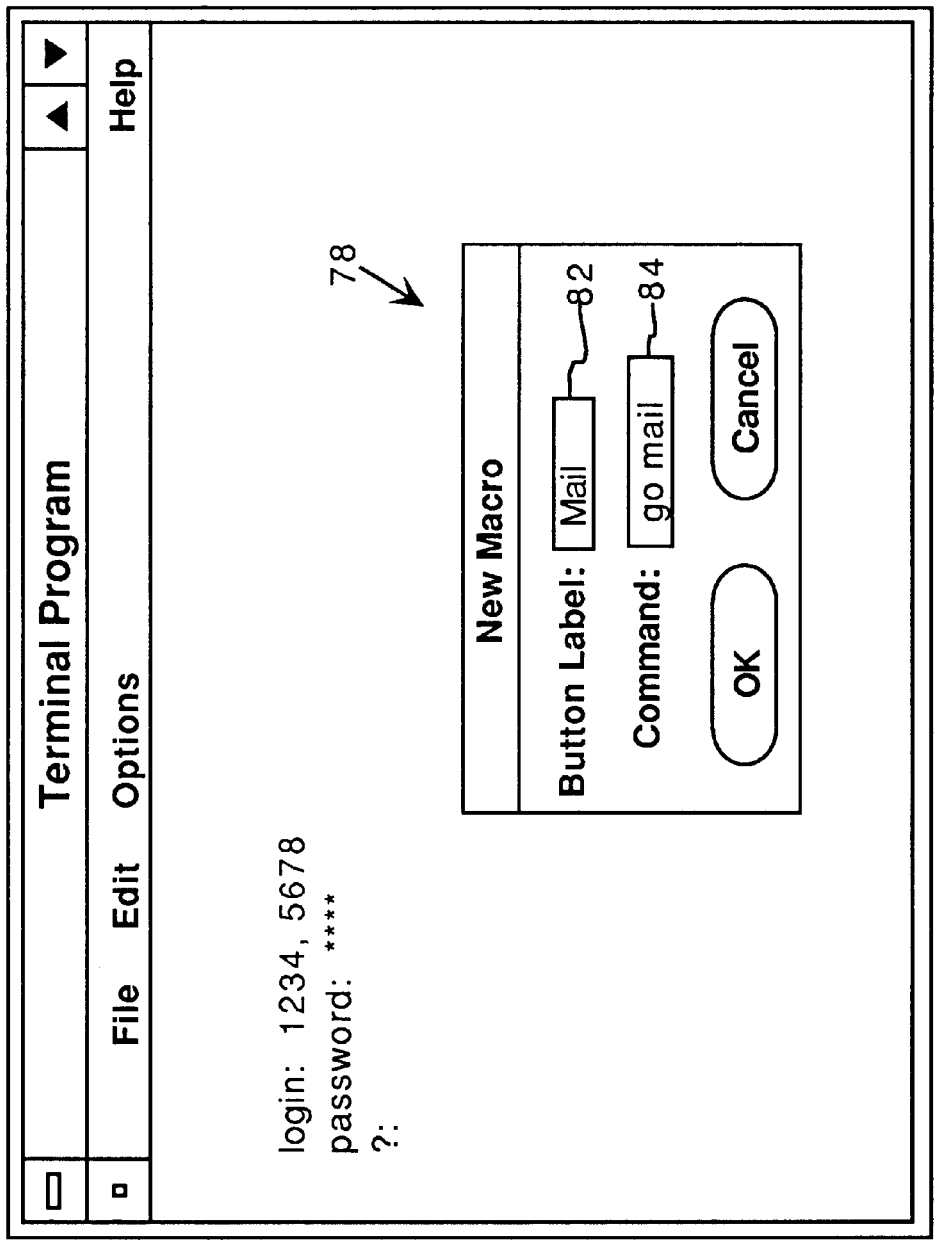
FIG. 5 shows the program window of FIG. 4 with a configuration dialog box.

In response, referring now to FIG. 5, the program displays a dialog box 78. The elements and operation of this dialog box 78 are identical to that described in reference to FIG. 2. In the example, the user has entered "Mail" in the "Command Label" text entry box 82 and "go mail" in the "Command" text entry box 84.

Figure 6:
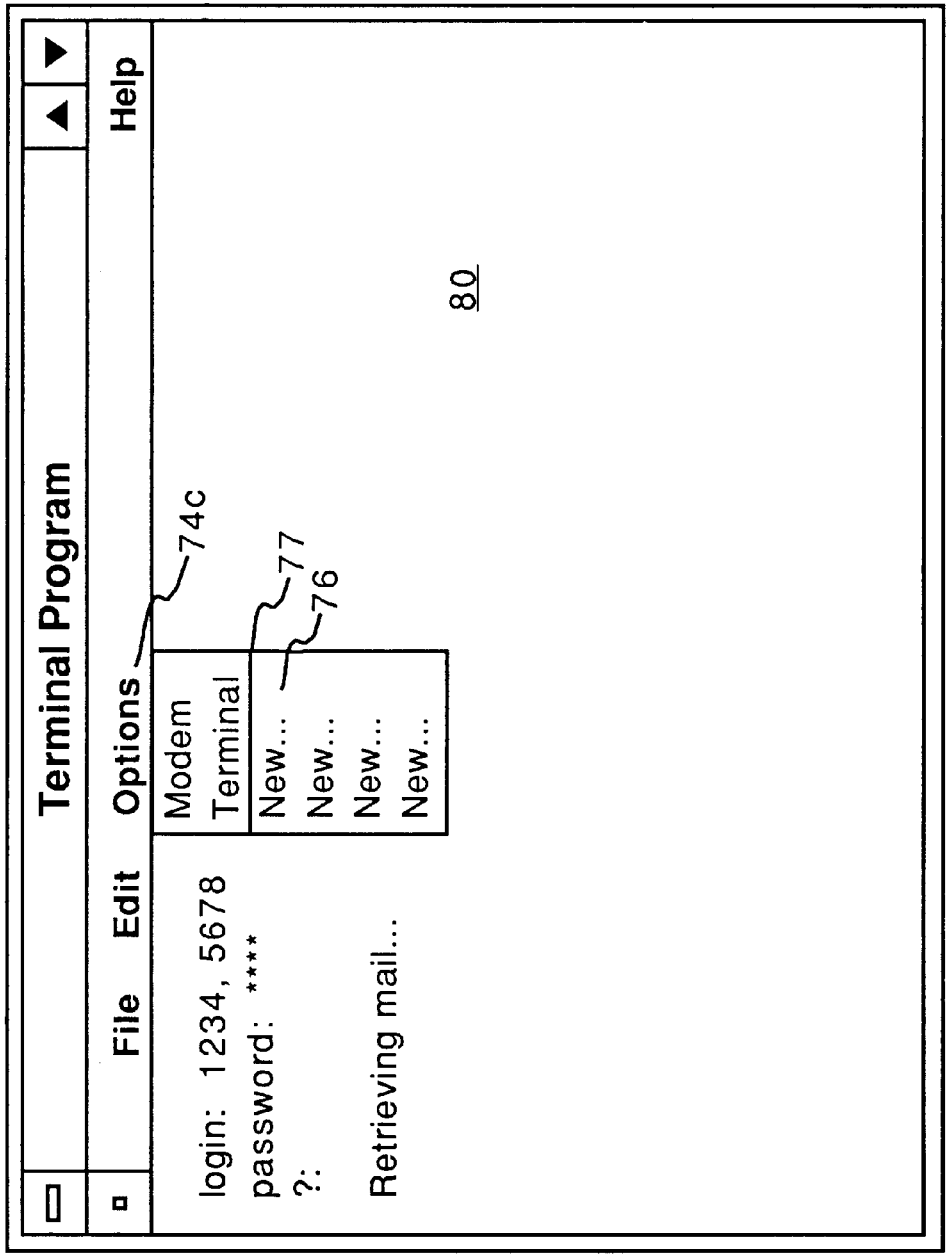
FIG. 6 shows the program window of FIG. 4 after configuration of an entry in the menu list.

Refer now to FIG. 6 which shows the program window 70 after the user has accepted the new menu configuration. The first command 76 below the line 77 of the "Options" menu 74c 10 now shows the label "Mail." The program has executed the new command by entering "go mail" at the prompt. The remote host has responded with "Retrieving mail . . . " and will soon display its mail program screen in the work area 80.

Ordinarily, after a command is selected from a menu, is the menu disappears and the command is executed. The "Options" menu 74c is visible in FIG. 6 to show the changed label 76.

Like the buttons 42a–42d, a menu command 76 can be reconfigured. They cannot be reconfigured by merely selecting them as when they were first configured; this would cause their associated commands to be executed. Instead, to reconfigure a menu command, it must be "specially" selected, that is selected with a "shift" key, "alt" key, "control" key, or other such key depressed. Alternatively, a secondary button on the mouse may be used to select the button.

In response to a menu command 76 being specially selected, the dialog box 78 shown in FIG. 5 is displayed. The text entry boxes contain the current label and command, respectively. The user is able to change either or both boxes, and accept or reject the changes.

Figure 7:
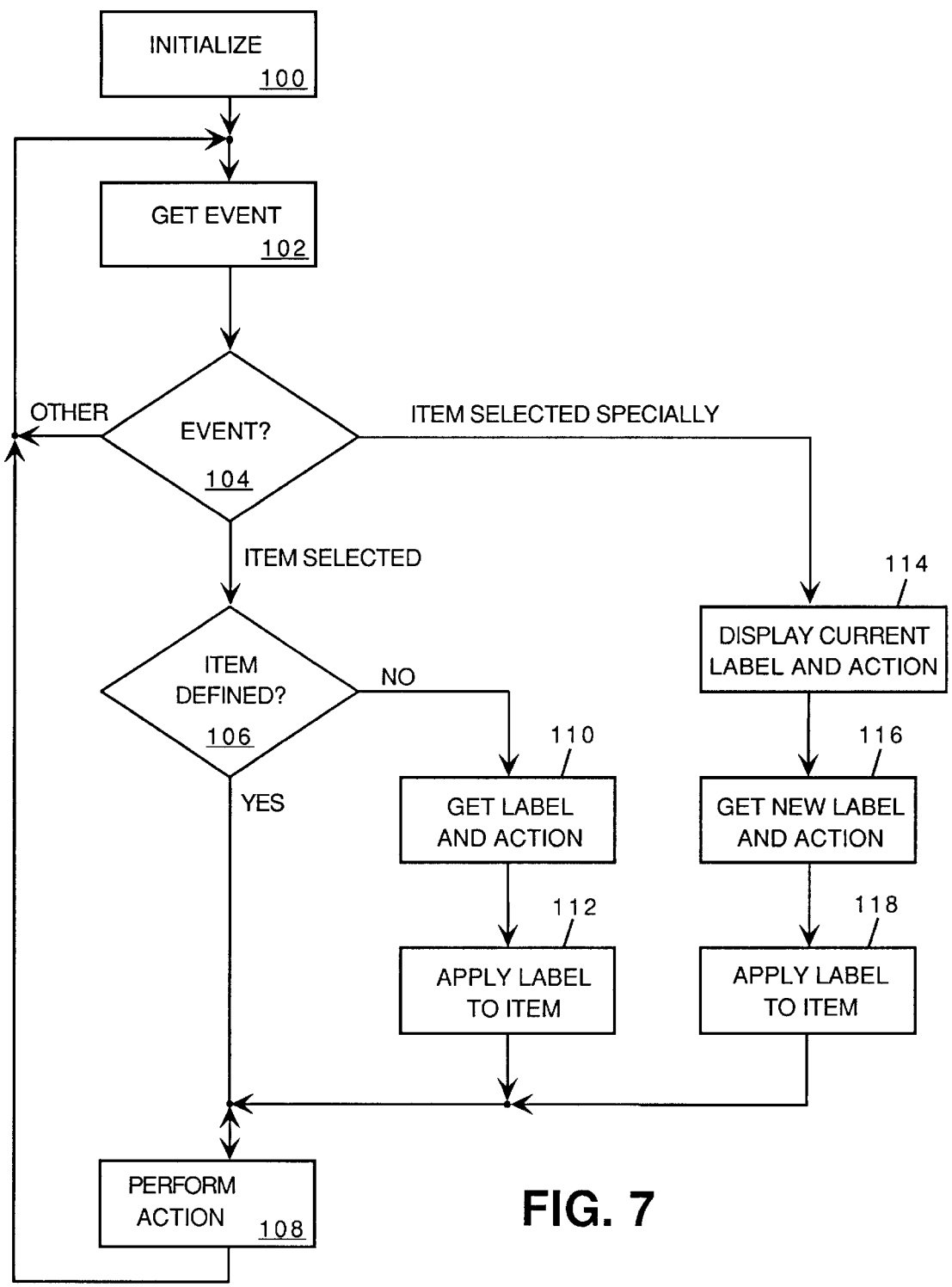
FIG. 7 shows a flow chart that shows the overall software implementation of the present invention.

Referring now to FIG. 7, there is shown a flowchart of a software implementation of the present invention. In block 100, the system is initialized. In this step, undefined configurable items such as buttons 42a–42d (FIGS. 1–3) or menu commands 76 (FIGS. 4–6) are associated with the label "New . . . " Items that have been user configured are associated with the user-defined labels.

After initialization, the system captures "events" for processing at block 102. Events are inputs to the computer, such as keypresses, mouse movements, and mouse key-clicks.

The capture events are analyzed at block 104. If the event is the selection of a reconfigurable item, the system checks to see if the item has been defined, at block 106. If the item has been defined, its associated command is executed at block 108 and control returns to block 102. If the item has not been defined, the system prompts the user for a label and command at block 110. The label is applied to the item at block 112, and the command is executed at block 108.

If the analysis at block 104 determines that a reconfigurable item has been specially selected, the system starts the process of redefining the item. The system displays the current label and command at block 114. The system then prompts the user for a new label and command at block 116. The new label is applied to the item at block 118, and the new command is executed at block 108.

If the analysis at block 104 determines that an item has not been selected, either normally or specially, the system of the present invention does not process the event.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

I claim:

1. A method for run-time configuration of user interfaces, comprising:

displaying a selectable user-configurable item within a user interface of an executing application program;

detecting when the item is selected, and;

prompting for an executable action to associate with the selection of the item, if no executable action is associated with the selection of the item;

associating the executable action with said selected item so as to configure the user interface of the executing application program.

2. The method of claim 1, wherein prompting for the executable action further comprises:

i) prompting for a label for the item; and ii) applying the label to the item.

3. The method of claim 1, further comprising:

performing the executable action in response to a subsequent selection of the item.

4. The method of claim 1, wherein the selectable user-configurable item is a button.

5. The method of claim 4, wherein prompting for the executable action further comprises:

i) prompting for a label for the button; and ii) applying the label to the button.

6. The method of claim 2, wherein the label is a text label.

7. The method of claim 1, wherein the selectable user-configurable item is a menu item within a menu list of a menu within the user interface, the step of displaying the selectable item includes displaying the item on a menu within the user interface.

8. The method of claim 7, wherein prompting for the executable action further comprises:

i) prompting for a label for the menu item; and ii) applying the label to the menu item.

9. A method of operating a computer system, comprising:

displaying at least one selectable user-configurable item of an executing application program on a display screen of the computer system;

detecting when the item has been selected, and;

prompting for an executable action to associate with the selection of the item, if no executable action is associated with the selection of the item;

associating the executable action with said selected item so as to configure the user interface of the executing application program.

10. The method of claim 9, further comprising:

performing the executable action in response to a subsequent selection of the item.

11. The method of claim 9, wherein prompting for the executable action further comprises:

i) prompting for a label for the item; and ii) applying the label to the item.

12. The method of claim 9, wherein the user-configurable item is a button.

13. The method of claim 12, wherein prompting for the executable action further comprises:

i) prompting for a label for the button; and ii) applying the label to the button.

14. The method of claim 9, wherein the user-configurable item is a menu item within a menu list of a menu within a user interface.

15. The method of claim 14, wherein prompting for the executable action further comprises:

i) prompting for a label for the menu item; and ii) applying the label to the menu item.

16. An article of manufacture, comprising a computing-device readable medium having instructions encoded thereon to cause a processor to perform the steps of claim 9.

17. An article of manufacture, comprising a computing-device readable medium having instructions encoded thereon to cause a processor to perform the steps of claim 1.

18. A method for run-time configuration of user interfaces, comprising:

step for displaying a selectable user-configurable item within a user interface of an executing application program;

step for detecting when the item is selected; and step for prompting for an executable action to associate with the selection of the item, if no executable action is associated with the selection of the item;

step for associating the executable action with said selected item so as to configure the user interface of the executing application program.

19. A method according to claim 16, wherein the executing application program is selected from a group consisting of an operating system, a networked application program, and a communication program.

20. A system, comprising:

means for displaying a selectable user-configurable item within a user interface of an executing application program;

means for detecting when the item is selected; and means for prompting for an executable action to associate with the selection of the item, if no executable action is associated with the selection of the item;

means for associating the executable action with said selected item so as to configure the user interface of the executing application program.

* * * * *